June 2, 1942.  R. S. BOWSER  2,285,006

TACHOMETER GENERATOR

Filed Feb. 18, 1941

INVENTOR.
Roy S. Bowser,
BY Bodell & Thompson
ATTORNEYS.

Patented June 2, 1942

2,285,006

UNITED STATES PATENT OFFICE 2,285,006

TACHOMETER GENERATOR

Roy S. Bowser, Syracuse, N. Y.

Application February 18, 1941, Serial No. 379,487

2 Claims. (Cl. 175—183)

This invention relates to tachometers of the type employing an indicating instrument of the voltmeter type and an alternating current generator to energize the instrument, the theory of operation being that the voltage produced by the generating element is in proportion to the speed at which the rotor of the element is rotated. While instruments of this type have the advantage of being free from commutator and brush troubles, they have the disadvantage in not accurately indicating the speed of the element being tested particularly through the upper range of the instrument. I have found this inaccuracy to result from the increase in frequency and voltage with the increase in the speed of the rotor of the generator. The result is that the indicating instrument indicates a higher speed than the rotor is actually rotating. The only way to overcome this difficulty is to graduate the dial of each instrument by hand, which adds materially to the cost of the tachometer, and the graduations are not uniformly spaced, but vary from the bottom to the top of the scale of the instrument.

This invention has as an object a tachometer of the type referred to, the generating element of which embodies a structure which functions to produce a current causing the indicating instrument to respond in direct proportion to the speed of the rotor and with uniform movement, all whereby commercial voltmeters readily procurable on the open market can be employed in the tachometer and avoiding the necessity of hand calibrating a particular instrument for a particular generator.

The invention consists in the novel features and in the combinations and constructions hereinafter set forth and claimed.

In describing this invention, reference is had to the accompanying drawing in which like characters designate corresponding parts in all the views.

Figure 1:
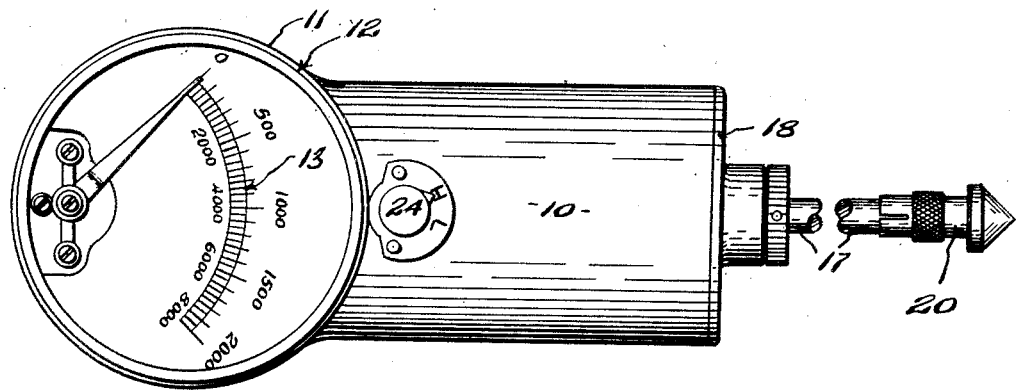
Figure 1 is a top plan view of a tachometer embodying my invention.
Figure 2:
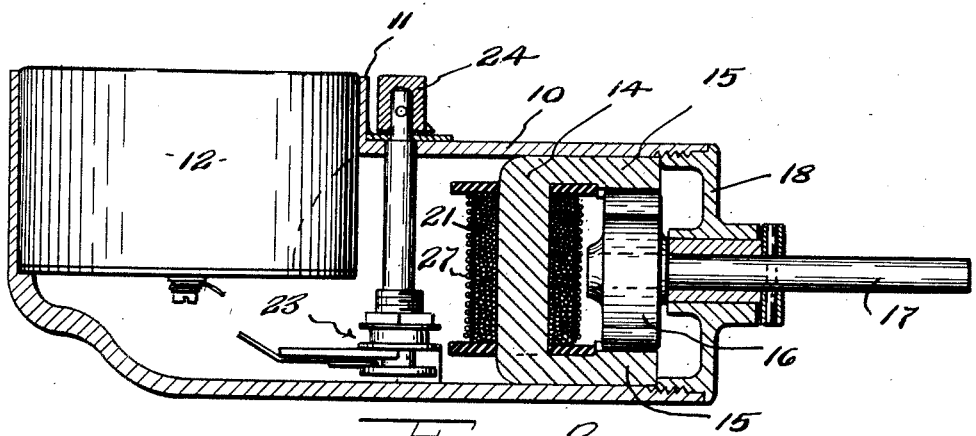
Figure 2 is a vertical sectional view with parts in elevation.

The casing consists of a cylindrical portion 10 in which the generator is mounted, and a cylindrical portion 11 in which the indicating instrument 12 is mounted. The casings 10, 11 are arranged in angular relation so that the graduations 13 on the instrument may be most conveniently read while the instrument is held in the hand. The instrument 12 is a conventional or commercial type voltmeter having connections for a high and low scale, as for example 7½ and 30 volts.

The generator consists of a laminated U shaped stator member 14 having pole pieces 15 and a permanent magnet rotor 16 mounted upon a shaft 17 journalled in a cap 18. The cap 18 is detachably mounted in the end of the casing portion 10 as by threading into the same, and the shaft 17 extends outwardly to receive a suitable dragging tip 20. The arrangement is such that the rotor 16 is mounted for rotation in juxtaposition to the pole pieces 15 and functions to induce a current in the instrument coil 21 in the usual manner. One side of the coil 21 is directly connected to the instrument as by wire 22, and the opposite side of the coil is connected to a switch 23 which is actuated by a button 24 arranged exteriorly of the casing and by which the switch is manipulated to connect the instrument coil to wire 25 or wire 26. Connection to one wire gives a reading on one of the scales of the graduations 13, for example the lower scale 0 to 2000. Connection to the other wire gives a reading on the higher scale 0 to 8000.

Figure 3:
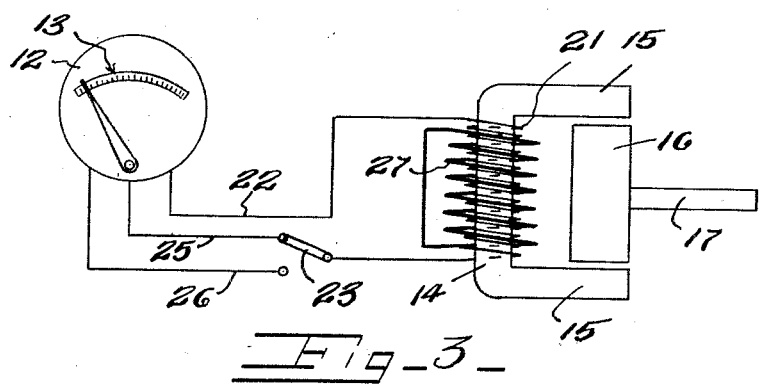
Figure 3 is a schematic wiring diagram of the generator and connections to the voltmeter.

The generator further includes a compensating coil 27 connected or closed upon itself. This coil is illustrated in the schematic diagram in Figure 3 by heavy lines.

The current induced in the instrument coil 21 is of a frequency in direct proportion to the speed at which the rotor 16 is rotated and, of course, can not be modified. However, the voltage in the coil 21 is modified due to the action of the compensating coil 27. I have found that when the frequency of the current induced in the coils 21, 27 is relatively low, as for example during rotation of the rotor up to approximately 1000 R. P. M., there is very little current induced in the compensating coil 27. However, as the frequency and voltage are increased upon increase in speed of the rotor, there is also a proportional increase of current induced in the compensating winding 27. As this current increases in value, it opposes the alternating magnetic flux set up in the core by the rotating magnetic field, thereby decreasing the voltage generated in the instrument coil 21. The result is that the current delivered to the indicating voltmeter is comparable to the characteristics of that instrument and causes the hand of the instrument to move uniformly in proportion with the speed of the rotor throughout the entire range of the instrument.

I have discovered that if the compensating coil is wound with approximately one percent of the number of turns of the instrument coil 21, the output of the generator effects proper operation of all commercial type voltmeters. Accordingly, the dials of these indicating instruments may be printed in volume and a dial attached to each instrument with assurance that the instrument will indicate the true speed throughout its entire range. This avoids the necessity of hand calibrating each instrument and is of further great importance in that if the instrument should become damaged or defective, a new instrument can be quickly and conveniently substituted where otherwise it would be necessary to calibrate the instrument for the particular generator and it could thereafter be used only with that generator unless it were again re-calibrated.

What I claim is:

1. A hand manipulated tachometer comprising a suitable casing, an indicating instrument of the voltmeter type mounted in said casing, said instrument having a dial graduated uniformly throughout the range of movement of the instrument hand, an alternating current generator mounted in the casing, said generator comprising a stator having pole pieces, an instrument energizing coil arranged on said stator and being connected to said instrument, a permanent magnet rotor journalled in the casing in juxtaposition to said stator and being operable upon rotation to induce a current in said instrument coil, and a closed compensating coil arranged on said stator to oppose the alternating magnetic flux in said stator and to increase such opposition in proportion to any increase in the frequency in the instrument winding.

2. A hand manipulated tachometer comprising a suitable casing, an indicating instrument of the voltmeter type mounted in said casing, said instrument having a dial graduated uniformly throughout the range of movement of the instrument hand, an alternating current generator mounted in the casing, said generator comprising a stator having pole pieces, an instrument energizing coil arranged on said stator and being connected to said instrument, a permanent magnet rotor journalled in the casing in juxtaposition to said stator and being operable upon rotation to induce a current in said instrument coil, and a closed compensating coil arranged on said stator, said compensating coil consisting of approximately one percent of the number of turns of said instrument coil and being operable to oppose the alternating magnetic flux in said stator and to increase such opposition in proportion to any increase in the frequency current in the instrument winding.

ROY S. BOWSER.